(12) United States Patent
Aimone

(10) Patent No.: US 10,180,844 B2
(45) Date of Patent: Jan. 15, 2019

(54) BOOT PATH AND PRODUCTION PATH ACCESSIBLE STORAGE SYSTEM

(71) Applicant: Oracle International Corporation, Redwood Shores, CA (US)

(72) Inventor: Jon K. Aimone, Tracy, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 185 days.

(21) Appl. No.: 15/411,467

(22) Filed: Jan. 20, 2017

(65) Prior Publication Data

US 2018/0210736 A1 Jul. 26, 2018

(51) Int. Cl.
| G06F 1/00 | (2006.01) |
| G06F 9/4401 | (2018.01) |
| G06F 13/40 | (2006.01) |
| G06F 9/50 | (2006.01) |
| G06F 9/455 | (2018.01) |

(52) U.S. Cl.
CPC ........ *G06F 9/4406* (2013.01); *G06F 9/45558* (2013.01); *G06F 9/5016* (2013.01); *G06F 13/4022* (2013.01); *G06F 2009/45562* (2013.01); *G06F 2009/45579* (2013.01)

(58) Field of Classification Search
CPC .. G06F 9/4406; G06F 9/45558; G06F 9/5016; G06F 13/4022; G06F 2009/45562; G06F 2009/45579
USPC ...................... 718/1; 713/1, 2; 711/161, 170
See application file for complete search history.

(56) References Cited

U.S. PATENT DOCUMENTS

| | | | |
|---|---|---|---|
| 6,981,125 B2 | 12/2005 | Emmes | |
| 7,669,048 B2* | 2/2010 | Frank | G06F 21/572 705/400 |
| 8,239,655 B2 | 8/2012 | Goggin et al. | |
| 8,336,050 B2 | 12/2012 | Dake | |
| 8,452,901 B1* | 5/2013 | Sandstrom | G06F 11/079 707/752 |
| 8,713,295 B2* | 4/2014 | Bax | G06F 9/4405 713/1 |
| 8,886,867 B1 | 11/2014 | Bolt | |
| 9,450,960 B1* | 9/2016 | McCorkendale | H04L 63/10 |
| 2006/0218388 A1* | 9/2006 | Zur | G06F 9/4416 713/2 |
| 2006/0230454 A1* | 10/2006 | Achanta | G06F 21/562 726/24 |
| 2006/0277383 A1* | 12/2006 | Hayden | H04L 67/1097 711/170 |
| 2011/0078680 A1* | 3/2011 | Lagergren | G06F 9/5077 718/1 |
| 2011/0231541 A1* | 9/2011 | Murthy | G06F 3/0613 709/224 |

(Continued)

*Primary Examiner* — Aurel Prifti

(74) *Attorney, Agent, or Firm* — Kilpatrick Townsend & Stockton LLP

(57) ABSTRACT

The concepts described herein include a storage access system including two access paths using different path configurations resulting in the ability to do a two part boot from the same boot memory. The two storage access paths address the boot memory using a globally unique identifier. The first storage path is a slower path that transfers instructions from the boot memory to configure the second storage path used to transfer the operating system from the boot memory.

20 Claims, 4 Drawing Sheets

(56) References Cited

U.S. PATENT DOCUMENTS

| | | | |
|---|---|---|---|
| 2012/0060153 A1* | 3/2012 | Bealkowski | G06F 9/45558 |
| | | | 718/1 |
| 2013/0212345 A1* | 8/2013 | Nakajima | G06F 3/0605 |
| | | | 711/161 |
| 2014/0164752 A1* | 6/2014 | Venkiteswaran | G06F 9/4416 |
| | | | 713/2 |
| 2014/0194848 A1* | 7/2014 | Aeschlimann | A61M 5/14244 |
| | | | 604/500 |
| 2014/0201734 A1* | 7/2014 | McMullan | H04L 12/6418 |
| | | | 718/1 |
| 2016/0119421 A1 | 4/2016 | Semke et al. | |
| 2016/0294609 A1* | 10/2016 | Rao | H04L 41/082 |
| 2016/0306757 A1* | 10/2016 | McCabe | G06F 8/654 |
| 2017/0277646 A1* | 9/2017 | Stankey | G06F 13/4022 |

* cited by examiner

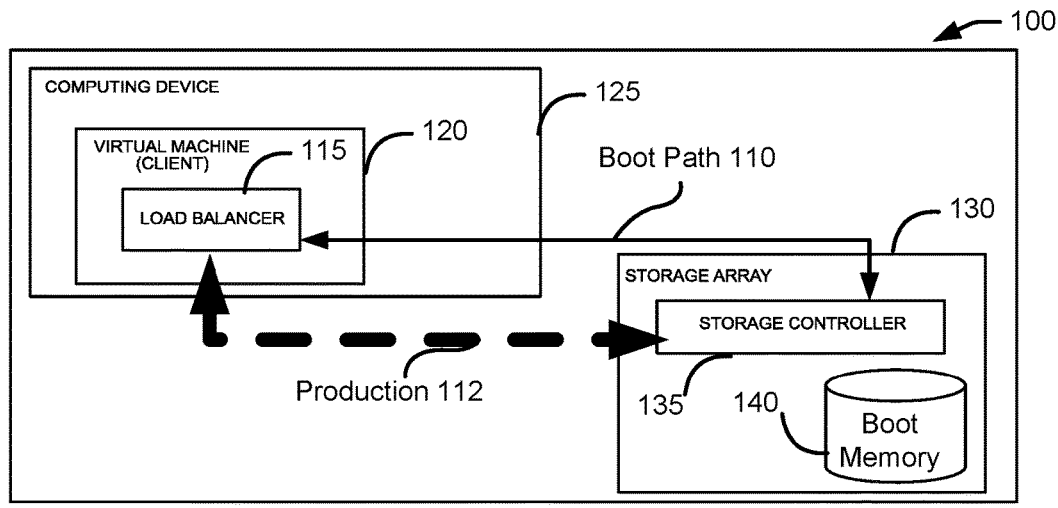
FIG. 1A Boot Mode
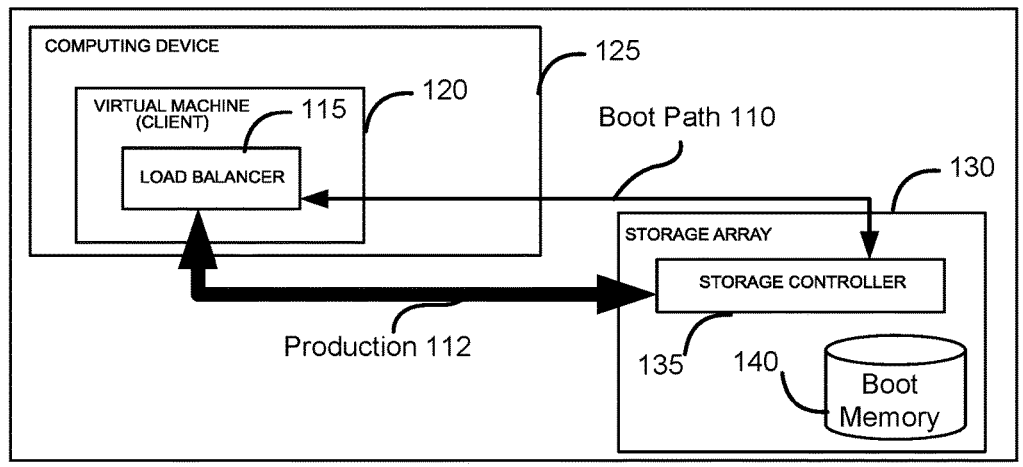
FIG. 1B Configured Mode
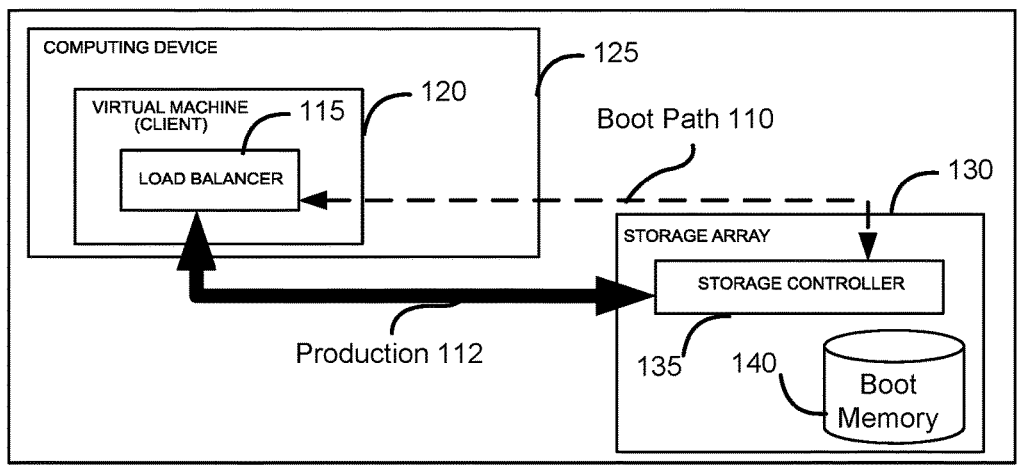
FIG. 1C Production Mode

US 10,180,844 B2

BOOT PATH AND PRODUCTION PATH ACCESSIBLE STORAGE SYSTEM

TECHNICAL FIELD

Aspects of the present disclosure relate to computing devices and, in particular, to a storage access system using an internet small computer systems interface (iSCSI) target over a high speed network topology and method of operating the same.

BACKGROUND

Production data communication interfaces sometimes lack sufficient on-board programmable read-only memory for machines to boot using the internet small computer system interface. As a result, typical systems use a multi-stage boot process. In the first stage a small boot kernel, capable of configuring a production data communication interface and internet small computer system interface, loads from a local device. In the second stage the full operating system is loaded using the internet small computer system interface over the production data communication path from another storage device. This multi-stage process requires systems to maintain multiple storage devices for the sole purpose of booting the machine.

BRIEF SUMMARY

In one embodiment presently described is a storage access system comprising one or more data processors and a boot memory which itself comprises a boot kernel comprising first instructions and an operating system comprising second instructions. The storage access system further comprises a non-transitory computer readable storage medium containing instructions that when executed on the one or more data processors, cause the one or more data processors to perform actions including: receiving a request to create a virtual machine; creating an instance of the virtual machine, wherein the virtual machine comprises initial instructions, and wherein the initial instructions facilitate initiating and enabling a boot path from the virtual machine to the boot memory; executing the initial instructions to initiate the boot path, configure the boot path, and enable the boot path; transferring, using the boot path, the boot kernel to the virtual machine from the boot memory; loading the boot kernel on the virtual machine; executing the first instructions of the boot kernel, wherein executing the first instructions causes configuring a production path between the virtual machine and the boot memory and enabling the production path; transferring, using the production path, the operating system to the virtual machine from the boot memory; loading the operating system on the virtual machine; executing the second instructions on the virtual machine; detecting that the production path has been successfully configured; and in response to the detecting, disabling the boot path. Another embodiment of the storage access system further comprises an action of detecting a production path failure or the virtual machine executing the initial instructions, and in response to the detecting, enables the boot path. A further embodiment of the storage access system further comprises a load balancer comprising a multiplex input/output (MPxIO) device that enables the virtual machine to be accessed through multiple storage access paths from a single operating system instance. An additional embodiment of the storage access system further comprises actions that connect the boot path to the boot memory using a single global user interface id and/or connect the production path to the boot memory using a single global user interface id. And yet a different embodiment of storage access system is wherein the boot path and the production path conform to an internet small computer system interface, wherein the boot path conforms to a Gb Ethernet protocol, or wherein the production path conforms to an Infiniband protocol.

Yet another embodiment presently described is a storage access method, the method comprising: executing, using one or more data processors, from a non-transitory computer readable storage medium, instructions that when executed on the one or more data processors, cause the one or more data processors to perform actions including: receiving a request to create a virtual machine; creating an instance of the virtual machine, wherein the virtual machine comprises initial instructions, and wherein the initial instructions facilitate initiating and enabling a boot path from the virtual machine to a boot memory. The boot memory comprises: a boot kernel comprising first instructions and an operating system comprising second instructions. Further performed actions include: executing the initial instructions to initiate the boot path, configure the boot path, and enable the boot path; transferring, using the boot path, the boot kernel to the virtual machine from the boot memory; loading the boot kernel on the virtual machine; and executing the first instructions of the boot kernel. Executing the first instructions causes: configuring a production path between the virtual machine and the boot memory; and enabling the production path. Further actions include: transferring, using the production path, the operating system to the virtual machine from the boot memory; loading the operating system on the virtual machine; executing the second instructions on the virtual machine; detecting that the production path has been successfully configured; and in response to the detecting, disabling the boot path. Another embodiment of the storage access method further comprises an action of detecting a production path failure or the virtual machine executing the initial instructions, and in response to the detecting, enables the boot path. A different embodiment of the storage access method further comprises a load balancer comprising a multiplex input/output (MPxIO) device that enables the virtual machine to be accessed through multiple storage access paths from a single operating system instance. An additional embodiment of the storage access method further comprises actions that connect the boot path to the boot memory using a single global user interface id and/or connect the production path to the boot memory using a single global user interface id. And yet a different embodiment of storage access method is wherein the boot path and the production path conform to an internet small computer system interface, wherein the boot path conforms to a Gb Ethernet protocol, or wherein the production path conforms to an Infiniband protocol.

A further embodiment presently described is a non-transitory computer-readable medium having sets of instructions stored thereon for storage access, comprising: executing, using one or more data processors, from a non-transitory computer readable storage medium, instructions that when executed on the one or more data processors, cause the one or more data processors to perform actions including: receiving a request to create a virtual machine; creating an instance of the virtual machine, wherein the virtual machine comprises initial instructions, and wherein the initial instructions facilitate initiating and enabling a boot path from the virtual machine to a boot memory. The boot memory comprises: a boot kernel comprising first instructions and an operating system comprising second instructions. Further performed actions include: executing the initial instructions to initiate the boot path, configure the boot path, and enable the boot path; transferring, using the boot path, the boot kernel to the virtual machine from the boot memory; loading the boot kernel on the virtual machine; and executing the first instructions of the boot kernel. Executing the first instructions causes: configuring a production path between the virtual machine and the boot memory; and enabling the production path. Further actions include: transferring, using the production path, the operating system to the virtual machine from the boot memory; loading the operating system on the virtual machine; executing the second instructions on the virtual machine; detecting that the production path has been successfully configured; and in response to the detecting, disabling the boot path. Another embodiment of the storage access method further comprises an action of detecting a production path failure or the virtual machine executing the initial instructions, and in response to the detecting, enables the boot path. A different embodiment of the non-transitory computer-readable medium having sets of instructions stored thereon for storage access further comprises a load balancer comprising a multiplex input/output (MPxIO) device that enables the virtual machine to be accessed through multiple storage access paths from a single operating system instance. An additional embodiment of the non-transitory computer-readable medium having sets of instructions stored thereon for storage access further comprises actions that connect the boot path to the boot memory using a single global user interface id and/or connect the production path to the boot memory using a single global user interface id. And yet a different embodiment of the non-transitory computer-readable medium having sets of instructions stored thereon for storage access is wherein the boot path and the production path conform to an internet small computer system interface, wherein the boot path conforms to a Gb Ethernet protocol, or wherein the production path conforms to an Infiniband protocol.

BRIEF DESCRIPTION OF THE DRAWINGS

The various features and advantages of the technology of the present disclosure will be apparent from the following description of particular embodiments of those technologies, as illustrated in the accompanying drawings. It should be noted that the drawings are not necessarily to scale; however the emphasis instead is being placed on illustrating the principles of the technological concepts. Also, in the drawings the like reference characters refer to the same parts throughout the different views. The drawings depict only typical embodiments of the present disclosure and, therefore, are not to be considered limiting in scope.

FIGS. 1A, 1B, and 1C illustrate an example storage access system according to the teachings of the present disclosure.

DETAILED DESCRIPTION

Figure 2:
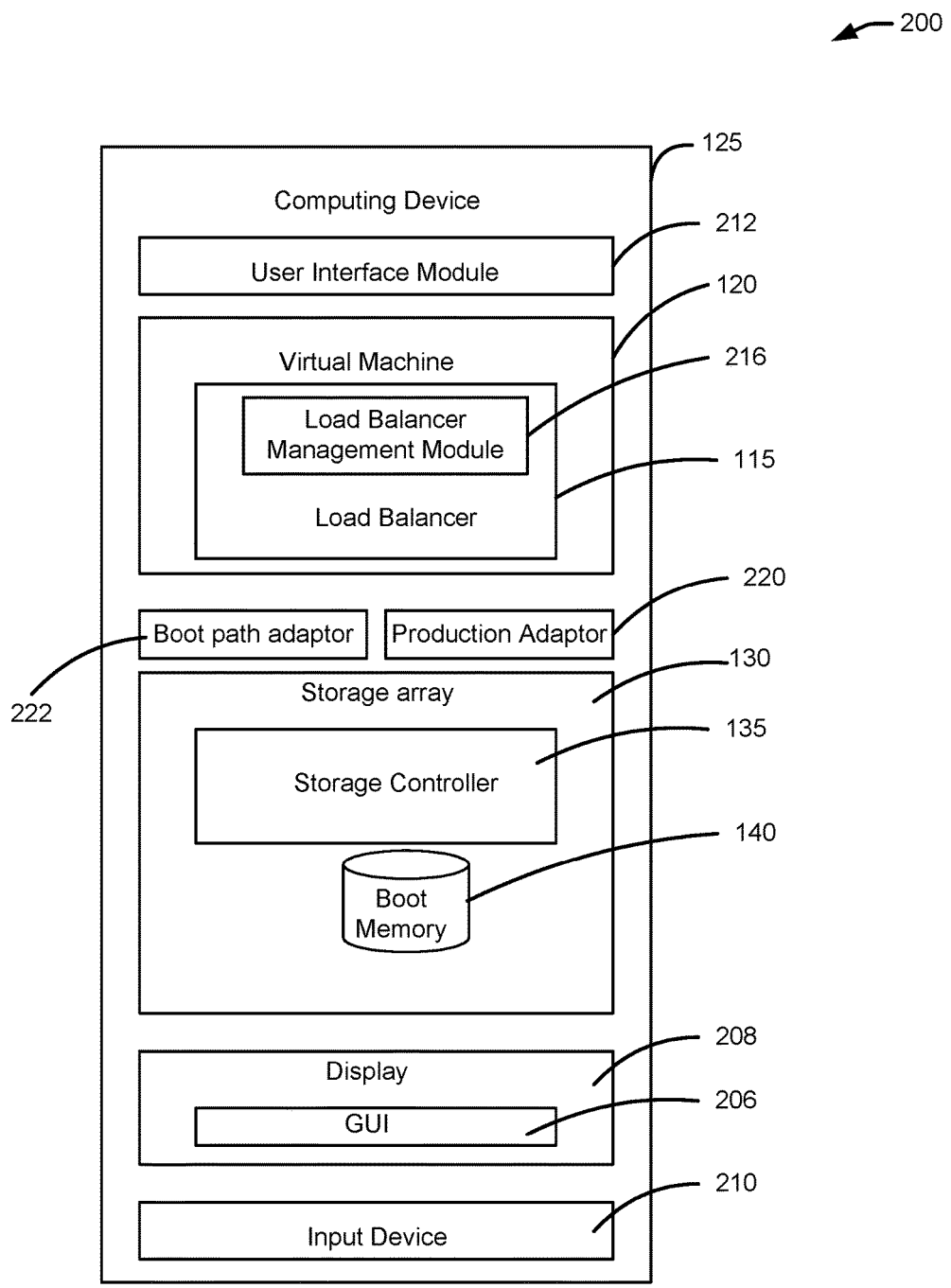
FIG. 2 illustrates a block diagram of an example storage access system executed on the storage access computing device according to one embodiment of the present disclosure.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments described. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the concepts described herein and otherwise intended as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional blocks not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Embodiments of the present disclosure provide a storage access system for managing a boot path and a production path to provide boot access capabilities to a virtual machine configured in a virtual computing environment.

The proliferation of virtualization techniques has been expanded into computer cluster designs due at least in part to the ability of multiple virtual resources to be created and deleted on demand, and to share workload with one another such that enhanced economies of scale may be achieved. One particular virtualization technique involves logical partitioning of one or more hardware resources of a physical computing device, such as that provided by single root input/output virtualization (SR-IOV). SR-IOV allows different virtual machines (VMs) to share hardware resources, such as a PCI Express interface often found on currently available physical (e.g., bare metal) computing devices.

Nevertheless, it has been projected that introducing SR-IOV into computing cluster designs may precipitate a proliferation of virtualized storage devices by numerous users. For example, current trends in the computing industry have evolved to provide computing environments in which computing resources are leased, rather than purchased by users (e.g., tenants). SR-IOV provides the tenant with additional management tools that could expand the usability of virtualized storage devices to the point where they become an integral component of many new implementations.

Leased data storage is often provided by logical domains (LDoms) in which each LDom comprises a fully functioning virtual machine (VM). These LDoms typically include an operating system (operating system) that can be started, stopped, configured, and rebooted independently of other LDoms, such as by a tenant who desires to manage the operation of the LDom independently of an administrator of the computing cluster. In some cases, a running LDom can be dynamically reconfigured to add or remove CPUs, RAM, or I/O devices without requiring a reboot operation. In some embodiments the LDom or virtual machine include a load balancer that controls and balanced the data traffic to and from the LDom.

The implementation of LDoms have provided an efficient, customizable solution to virtualized data storage. Nevertheless, the implementation of such a virtualized architecture may present several problems. High throughput or "production" network technologies, such as Infiniband (TB), IEEE 1394, and the like, often do not have interfaces with sufficient programmable read only memory to enable booting of the operating system associated with an LDom. Most conventional solutions have involved a multi-stage boot process where a boot kernel is initially loaded from a local/accessible device, which is then used to configure a high speed data channel interface to load the operating system from a second device. The boot kernel is a mini operating system for the virtual machine and it initiates and enable input/output and other functionality of the VM. This multi-stage boot process conventionally requires the operating system utilities to maintain multiple storage devices: one for the boot kernel and another for the full operating system. This problem is minimized in the present application by using a first communication channel to partially boot the virtual machine with a boot kernel with executable instructions that initiates and enables a high bandwidth communication channel used to finish loading the full operating system from the same storage device as the boot kernel. The high bandwidth or high threshold channel thus becomes the "production" channel used for data transfer during normal operations.

FIGS. 1A, 1B and 1C illustrate an example storage access system 100 according to the teachings of the present disclosure. The storage access system 100 addresses problems with conventional storage access systems among other benefits and solutions. The storage access system 100 comprises a computing device 125 as well as a storage array 130 with two communications paths between them. The first communication path is a boot path 110 such as a Gb Ethernet channel or the like as the concept described is not so limited and includes any boot capable communication protocol. The second communication path is a production path 112 such as an Infiniband channel or the like as the concepts described are not so limited and include any high speed, or high throughput communication protocol.

Referring now to FIG. 1A showing only the boot path 110 configured. Boot path 110 may be used for loading a boot kernel on the virtual machine 120 from boot memory 140, a mini operating system that, among other functions, will initiate and enable the production path 112. Once the virtual machine 120 is completely booted, continuous access to boot memory 140 over the boot path 110 could possibly create network bandwidth saturation issues resulting in a denial of access for managing resources in the virtual computing environment when numerous virtual machines 120 are deployed. That is, the boot path 110 may not have the capability of providing sufficient bandwidth when there are multiple virtual machines 120 deployed. Therefore, any traffic over the boot path 110 should be temporary and limited to those operations that may not be easily performed by the production path 112. The production path is shown in dashed lines in FIG. 1A. That is because until the boot kernel is installed and running on the virtual machine 120, the production path 112 is not enabled to be operational and is not recognized by the boot environment of the virtual machine.

While the boot path 110 enables the virtual machine 120 to boot from a boot kernel, it may not provide sufficient throughput to load the full operating system. Thus, as shown in FIG. 1B, the production path 112 is enabled by the boot kernel in the virtual machine 120 to provide the production path 112 to load the full operating system from boot memory 140 to complete the full boot of the virtual machine 120. During this time, both the boot path 110 and the production path 112 are enabled as shown in FIG. 1B.

Referring now to FIG. 1C, showing the production mode of the storage access system 100. Here the boot path 110 is shown as a dotted line indicating that it is disabled during normal production mode to prevent network bandwidth saturation issues resulting in a denial of access for managing resources in the virtual computing environment. The production path 112 is fully enabled and operational. However, should the virtual machine 120 need to reboot or enter boot mode for any reason, production path 112 will no longer be enabled or operational until the boot kernel has initiated and enabled it again.

The storage controller 135 may control the operation of the production path 112 and boot path 110. The load balancer 115 may also control the operation of the production path 112 and the boot path 110. In general, the load balancer 115 distributes workloads across multiple storage access paths, such as the production path 112 and boot path 110, and may be used to optimize resource usage, maximize throughput, minimize response time, and avoid overload of any single storage access path. The load balancer 115 can operate to effectively disable either path. Additionally, the use of multiple storage access paths instead of a single storage access path may increase reliability and availability through redundancy.

In one embodiment, the load balancer 115 comprises a multiplex input/output (MPxIO) device or software module that enables a storage device to be accessed through multiple host controller interfaces from a single operating system instance. The MPxIO architecture helps protect against outages due to I/O controller failures. Thus, should one storage controller fail, the MPxIO device automatically switches to an alternate controller so that service is maintained.

The MPxIO load balancer does not need to use the same transport medium (e.g. Ethernet, IB, etc.). That is, the MPxIO load balancer provides for mixing of storage access paths that conform to different protocols. Additionally, the MPxIO load balancer presents as a single globally unique identifier (GUID). In this manner, the MPxIO may balance the traffic between the boot path 110 and the production path 112 and/or alternatively select one of storage access paths for handling all of the traffic on each.

The computing components of a virtual computing environment solution may include one or more servers, data storage components, networking equipment, and software for managing the integrated components. To assist in the scalability, management and sharing of resources, particularly in large computing system environments, virtual computing environments may involve a pool of server, storage and networking capacities, typically virtualized, that can shared by multiple applications. One particular example of a virtualized computing environment includes an Oracle™ Supercluster line of Engineered Systems from Oracle Corporation, which is headquartered in Redwood City, Calif.

Example hardware resources of a virtual computing environment may include any type of hardware that provides physical resources for the virtual computing environment while the virtual resources include logical entities. such as virtual machines 120. Virtual resources may also include logical configuration constructs, such as storage partitions (e.g., tenant partitions), port groups, virtual private clouds, virtual local area networks (LANs), private virtual data centers (PVDCs), that may be individually allocated to one or more users commonly referred to as tenants.

In one embodiment, the virtual machine may comprise guest logical domains (LDoms) as specified by Oracle virtual machine Server for SPARC™ server virtualization and partitioning system from Oracle Corporation, which is headquartered in Redwood City, Calif. In general, each LDom is essentially a full virtual machine that is configurable with one or more characteristics, redundancy level (e.g., redundant array of inexpensive disks (RAID) settings, etc.), latency time, failover procedures, and the like. LDoms can be securely live migrated between servers while running. Operating systems (operating system s) running inside LDoms can be started, stopped, and rebooted independently of other LDoms. Additionally, a running LDom can be dynamically reconfigured to add or remove CPUs, RAM, or I/O devices without requiring a reboot.

Each guest LDom may be configured as an I/O domain with at least one local Infiniband (IB) channel adapter for providing the production path 112 and at least one Ethernet adapter for providing the boot path 110. Additionally, management network access arrives either via the local Ethernet adapter or one or more virtual networks provided from a service LDom of the Oracle virtual machine Server for SPARC™ server virtualization and partitioning system. Additionally, each guest LDom may have storage area network (SAN) access to storage on the file system (e.g., ZFS file system) via iSCSI over both the boot path 110 (e.g., Gb Ethernet interface) as well as the production path 112 (e.g., IB interface (IPoIB or iSER)). Thus, the boot path 110 provides for installation of boot kernels in guest LDoms, while iSCSI over IB provides for operating system downloading and access to virtual storage elements and additional storage as may be implemented in each LDom.

Some storage paths using the iSCSI protocol typically have throughput rates of approximately 1 Gigabit per second, while other high speed, high threshold (production) paths, such as those using the Infiniband (IB) protocol often have throughput rates of over 25 Gigabits per second. Thus, the production path 112 may be provided to take over communication with the virtual machine 120 once the boot path 110 has successfully pre-booted the virtual machine 120.

Any suitable communication protocol for the production path 112 may be used. Examples of suitable communication protocols include an Infiniband protocol and an Institute of Electrical and Electronics Engineers (IEEE) 1394 protocol. In one embodiment, the production path 112 conforms to the IB protocol. The IB protocol features high throughput while maintaining relatively low latency using a mesh type circuit topology. Also, the IB protocol may be utilized as either a direct, or switched interconnect between servers and storage systems, as well as an interconnect between storage systems.

Referring now in more detail to FIG. 2, a block diagram 200 of the computing device 125 according to one aspect of the present disclosure. Although blocks are shown drawn insidge the confines of the computing device 125—any number of all blocks encompassed may be standalone device interconnected with the other blocks in computing device 125. According to one aspect, the computing device 125 also includes a graphical user interface (GUI) 206 displayed on a display 208, such as a computer monitor for displaying data. The computing device 125 may also include an input device 210, such as a keyboard or a pointing device (e.g., a mouse, trackball, pen, or touch screen) to enter data into or interact with the GUI 206. According to one aspect, the storage controller 135 includes executable instructions or modules.

The storage array 130 includes volatile media, nonvolatile media, removable media, non-removable media, and/or another available medium. By way of example and not limitation, non-transitory storage array 130 comprises computer storage media, such as non-transient storage memory, volatile media, nonvolatile media, removable media, and/or non-removable media implemented in a method or technology for storage of information, such as computer readable instructions, data structures, program modules, or other data. The storage array 130 can be standalone device in a typical system.

A user interface module 212 displays information associated with operation of the virtual computing environment 116 and the load balancer 115, which is used to generate the boot path 110 and production storage access path 112. For example, the user interface module 212 may display some, most, or all resources that are available on the computing device 125, and may receive user input for managing those resources. Additionally, the user interface module 212 may receive user input for managing the operation of the load balancer 115 and displaying information associated with the operational status of the load balancer 115 and any boot capable storage access paths 110 or production paths 112 generated by the load balancer 115. For example, the user interface module 212 may display detailed information about boot memory 140 and any error conditions that may be associated with boot memory 140.

A load balancer management module 216 manages the operation of the load balancer 115. For example, the load balancer management module 216 may issue instructions to the load balancer 115 configure a production path 112 to a newly instantiated virtual machine 120, and disable the boot path 110 once the production path 112 has been successfully configured. Additionally, the load balancer management module 216 may communicate with the load balancer 115 to receive notifications regarding the operational status of the storage paths. For example, in the event that the production path 112 is unable to be properly configured on a newly instantiated virtual machine 120, the load balancer 115 may transmit a notification message indicating this failure condition so that the load balancer management module 216 may take appropriate remedial actions.

In one embodiment, the load balancer management module 216 may communicate with the load balancer 115 to load an operating system on the LDom and disable the boot path 110 once the operating system has been loaded and started on the LDom. Control over how the boot path 110 is disabled may be accomplished in any suitable manner. For example, the load balancer management module 216 may issue a request to the load balancer 115 to boot the virtual machine 120 using the boot path 110, and upon a response from the load balancer 115 indicating that the virtual machine 120 has been successfully booted and both the boot path 110 and production path 112 successfully started, issue a second request instructing that the load balancer 115 disable the boot path 110. As another example, the load balancer management module 216 may issue a request to the load balancer 115 to boot the virtual machine 120 using the boot path 110, and after a specified period of elapsed time, issue a second request instructing that the load balancer 115 disable the boot path 110. In this case, the load balancer 115 may be configured to automatically reject the second request in the event that the virtual machine 120 has not been successfully booted or that both the boot path 110 and production path 112 have not been successfully started. As such, the load balancer 115 may issue a response indicating that the boot path 110 was not able to be disabled so that the load balancer management module 216 may take further remedial action. A boot path adapter 222 is configurable to provide an interface to the virtual machine 120 for the boot path 110. Either the load balancer 115 or the load balance manager 216 can disable the interface to or the boot path adapter 222—essentially turning off communication over the boot path 110. A production path adapter 220 is configurable to provide an interface to the virtual machine 120 for the production path 112. Either the load balancer 115 or the load balance manager 216 can disable the interface to the production path adapter 220—essentially turning off communication over the production path 112.

It should be appreciated that the modules described herein are provided only as examples, and that the computing device 125 may have different modules, additional modules, or fewer modules than those described herein. For example, one or more modules as described in FIG. 2 may be combined into a single module.

Figure 3:
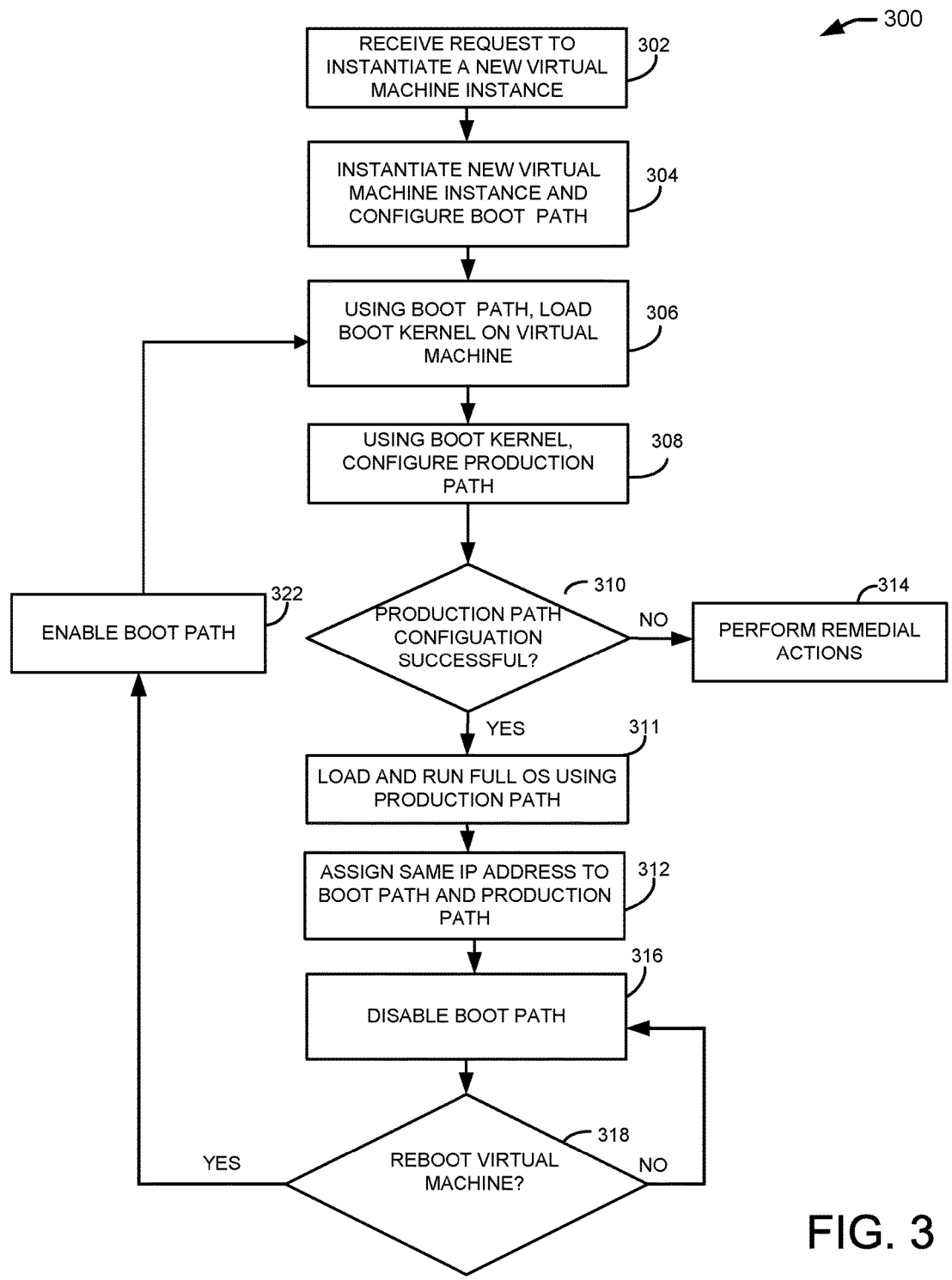
FIG. 3 illustrates an example process that may be performed by the storage access controller to generate and manage virtual storage elements in the virtual computing environment to provide storage access to a client of the virtual storage element according to one embodiment of the present disclosure.

FIG. 3 illustrates an example process that may be performed by the storage access system 100 to generate and manage virtual machine 120 to provide storage access to a client of the virtual machine 120 according to one embodiment of the present disclosure.

Initially at block 302, the computing device 125 receives a request to instantiate a new virtual machine 120. At block 304 the computing device 125 creates a new instance of the virtual machine 120 in response to that request. The new instance is a software object defining the virtual machine 120 and its functionality, including initial instructions. The virtual machine 120 functionality includes the ability to start the process to boot the virtual machine up by executing the initial instructions. This includes configuring and enabling the boot path 110 to communicate between the virtual machine and the boot memory 140.

At block 306, once the boot path 110 has been enabled the virtual machine 120 will execute initial instructions to initiate transferring a boot kernel from the boot memory 140 to the virtual machine. The boot kernel is software object containing executable instructions, that when executed, will further configure the virtual machine and additional functionality.

At block 308, the virtual machine 120 executes the instructions in the boot kernel to configure and enable the production path 112 (e.g., an Infiniband path) and enable other functionality of the virtual machine 120. In one particular embodiment the iSCSI is initiated to provide access to the underlying virtual machine 120 via the production path 112.

At block 310, if the production path 112 configuration is successful, processing continues at block 311; otherwise processing continues at block 314 in which one or more remedial actions may be taken to correct the error condition such as described herein above. At block 311 the virtual machine 120 requests the full operating system from the boot memory 140 using the production path 112. The full operating system comprises instructions that enable the full functionality of the virtual machine 120. Once the virtual machine 120 receives the full operating system it installs it and begins executing those instructions so that it is fully capable of performing all of its functions. At this point the load balancer 115 and load balancer manager 216 are fully enabled on the virtual machine 120.

At block 312, in one embodiment, virtual machine 120 instructs the load balancer 115 to configure both the boot path 110 and the production path 112 to connect with the boot memory 140 with a single GUID. Without the single GUID, the configuration of the boot path 110 and the production path 112 may be more complex, and hence error prone, because should a boot operation be attempted through a private IP address configured on a first of multiple redundant controllers that has failed, a second controller may not have easy access to the virtual machine 120. Thus, the single GUID configured by the load balancer 115 eliminates the need for multiple attempts using different IP addresses as would otherwise be required without it.

At block 316, load balance manager 216 or the load balancer 115 disable the boot path 110 such that all further access to the boot memory 140 is through the production path 112. The load balancer manager 216 or the load balancer 115 can disable the boot path in numerous ways including disabling the virtual boot path virtual interface or the boot path adapter 222. In the event that the production path 112 fails for any reason, the load balancer 115, load balance manager 216 or the virtual machine will re-enable the boot path 110. At block 318 the boot path 110 is re-enabled by the load balancer 115, the load balance manager 216, or the virtual machine 120 so that boot processing can continue at block 306.

During operation of the virtual machine 120, a request may be received to re-boot the virtual machine 120 at block 318 or the virtual machine 120 may start executing the initial instructions—indicating it is in boot mode. If so, processing continues at block 322; otherwise, processing continues at block 316 in which access to the virtual machine 120 is continually provided through the production storage access path 112.

The previous blocks may be repeatedly performed for instantiation of booting of additional virtual machine 120. Nevertheless, when use of the storage access system 100 is no longer needed or desired, the process ends.

Although FIG. 3 describes one example of a process that may be performed by the storage access system 100, the features of the disclosed process may be embodied in other specific forms without deviating from the spirit and scope of the present disclosure. For example, the storage access system 100 may perform additional, fewer, or different operations than those operations as described in the present example.

The description above includes example systems, methods, techniques, instruction sequences, and/or computer program products that embody techniques of the present disclosure. However, it is understood that the described disclosure may be practiced without these specific details.

In the present disclosure, the methods disclosed may be implemented as sets of instructions or software readable by a device. Further, it is understood that the specific order or hierarchy of blocks in the methods disclosed are instances of example approaches. Based upon design preferences, it is understood that the specific order or hierarchy of blocks in the method can be rearranged while remaining within the disclosed subject matter. The accompanying method claims present elements of the various blocks in a sample order, and are not necessarily meant to be limited to the specific order or hierarchy presented.

The described disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form (e.g., software, processing application) readable by a machine (e.g., a computer). The machine-readable medium may include, but is not limited to, magnetic storage medium (e.g., hard disk drive), optical storage medium (e.g., CD-ROM); magneto-optical storage medium, read only memory (ROM); random access memory (RAM); erasable programmable memory (e.g., EPROM and EEPROM); flash memory; or other types of medium suitable for storing electronic instructions.

Figure 4:
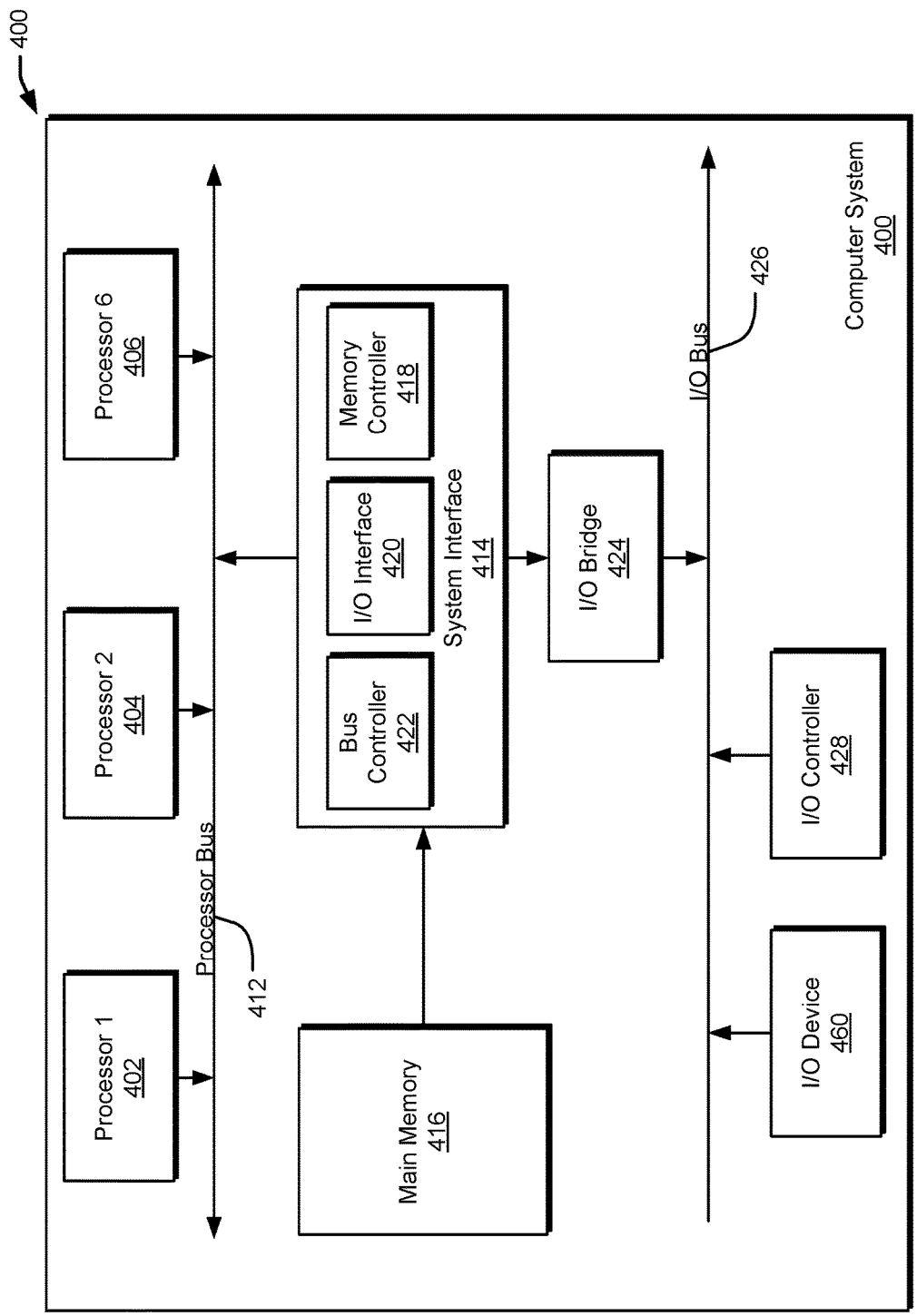
FIG. 4 is a block diagram illustrating an example of a computing device or computer system which may be used in implementing the embodiments of the present disclosure.

For example, FIG. 4 is a block diagram illustrating an example of a host or computer system 400 which may be used in implementing the embodiments of the present disclosure. The computer system (system) includes one or more processors 402-406. Processors 402-406 may include one or more internal levels of cache (not shown) and a bus controller or bus interface unit to direct interaction with the processor bus 412. Processor bus 412, also known as the host bus or the front side bus, may be used to couple the processors 402-406 with the system interface 414. System interface 414 may be connected to the processor bus 412 to interface other components of the system 400 with the processor bus 412. For example, system interface 414 may include a memory controller 418 for interfacing a main memory 416 with the processor bus 412. The main memory 416 typically includes one or more memory cards and a control circuit (not shown). System interface 414 may also include an input/output (I/O) interface 420 to interface one or more I/O bridges or I/O devices with the processor bus 412. One or more I/O controllers and/or I/O devices may be connected with the I/O bus 426, such as I/O controller 428 and I/O device 460, as illustrated.

I/O device 460 may also include an input device (not shown), such as an alphanumeric input device, including alphanumeric and other keys for communicating information and/or command selections to the processors 402-406. Another type of user input device includes cursor control, such as a mouse, a trackball, or cursor direction keys for communicating direction information and command selections to the processors 402-406 and for controlling cursor movement on the display device.

System 400 may include a dynamic storage device, referred to as main memory 416, or a random access memory (RAM) or other computer-readable devices coupled to the processor bus 412 for storing information and instructions to be executed by the processors 402-406. Main memory 416 also may be used for storing temporary variables or other intermediate information during execution of instructions by the processors 402-406. System 400 may include a read only memory (ROM) and/or other static storage device coupled to the processor bus 412 for storing static information and instructions for the processors 402-406. The system set forth in FIG. 4 is but one possible example of a computer system that may employ or be configured in accordance with aspects of the present disclosure.

According to one embodiment, the above techniques may be performed by computer system 400 in response to processor 402-406 executing one or more sequences of one or more instructions contained in main memory 416. These instructions may be read into main memory 416 from another machine-readable medium, such as a storage device. Execution of the sequences of instructions contained in main memory 416 may cause processors 402-406 to perform the process blocks described herein. In alternative embodiments, circuitry may be used in place of or in combination with the software instructions. Thus, embodiments of the present disclosure may include both hardware and software components.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. The computer-readable medium may be understood to include one or more computer-readable media of various forms, in various examples.

In the foregoing description, aspects of the application are described with reference to specific embodiments thereof, but those skilled in the art will recognize that the concept described is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described concepts may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as performing or being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm blocks described in connection with the embodiments disclosed herein may be implemented as electronic hardware, computer software, firmware, or combinations thereof. To clearly illustrate this interchangeability of hardware and software, various illustrative components, blocks, modules, circuits, and blocks have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present ideas.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A storage access system comprising:
   one or more data processors;
   a boot memory comprising:
      a boot kernel comprising first instructions; and
      an operating system comprising second instructions;
   a non-transitory computer readable storage medium containing instructions that when executed on the one or more data processors, cause the one or more data processors to perform actions including:
      receiving a request to create a virtual machine;
      creating an instance of the virtual machine, wherein the virtual machine comprises initial instructions, and wherein the initial instructions facilitate initiating and enabling a boot path from the virtual machine to the boot memory;
      executing the initial instructions to:
         initiate the boot path;
         configure the boot path; and
         enable the boot path;
      transferring, using the boot path, the boot kernel to the virtual machine from the boot memory;
      loading the boot kernel on the virtual machine;
      executing the first instructions of the boot kernel, wherein executing the first instructions causes:
         configuring a production path between the virtual machine and the boot memory; and
         enabling the production path;
      transferring, using the production path, the operating system to the virtual machine from the boot memory;
      loading the operating system on the virtual machine;
      executing the second instructions on the virtual machine;
      detecting that the production path has been successfully configured; and
      in response to the detecting, disabling the boot path.

2. The storage access system of claim 1, further comprising an action of detecting a production path failure or the virtual machine executing the initial instructions, and in response to the detecting, enables the boot path.

3. The storage access system of claim 1, further comprising a load balancer comprising a multiplex input/output (MPxIO) device that enables the virtual machine to be accessed through multiple storage access paths from a single operating system instance.

4. The storage access system of claim 1, further comprising actions that connect the boot path to the boot memory using a single global user interface id and/or connect the production path to the boot memory using a single global user interface id.

5. The storage access system of claim 1, wherein the boot path and the production path conform to an internet small computer system interface.

6. The storage access system of claim 1, wherein the boot path conforms to a Gb Ethernet protocol.

7. The storage access system of claim 1, wherein the production path conforms to an Infiniband protocol.

8. A storage access method, the method comprising:
   executing, using one or more data processors, from a non-transitory computer readable storage medium, instructions that when executed on the one or more data processors, cause the one or more data processors to perform actions including:
      receiving a request to create a virtual machine;
      creating an instance of the virtual machine, wherein the virtual machine comprises initial instructions, and wherein the initial instructions facilitate initiating and enabling a boot path from the virtual machine to a boot memory wherein the boot memory comprises:
         a boot kernel comprising first instructions; and
         an operating system comprising second instructions;
      executing the initial instructions to:
         initiate the boot path;
         configure the boot path; and
         enable the boot path;
      transferring, using the boot path, the boot kernel to the virtual machine from the boot memory;
      loading the boot kernel on the virtual machine;
      executing the first instructions of the boot kernel, wherein executing the first instructions causes:
         configuring a production path between the virtual machine and the boot memory; and
         enabling the production path;
      transferring, using the production path, the operating system to the virtual machine from the boot memory;
      loading the operating system on the virtual machine;
      executing the second instructions on the virtual machine;
      detecting that the production path has been successfully configured; and
      in response to the detecting, disabling the boot path.

9. The storage access method of claim 8, further comprising an action of detecting a production path failure or the virtual machine executing the initial instructions, and in response to the detecting, enables the boot path.

10. The storage access method of claim 8, further comprising a load balancer comprising a multiplex input/output (MPxIO) device that enables the virtual machine to be accessed through multiple storage access paths from a single operating system instance.

11. The storage access method of claim 8, further comprising actions that connect the boot path to the boot memory using a single global user interface id and/or connect the production path to the boot memory using a single global user interface id.

12. The storage access method of claim 8, wherein the boot path and the production path conform to an internet small computer system interface.

13. The storage access method of claim 8, wherein the boot path conforms to a Gb Ethernet protocol.

14. The storage access method of claim 8, wherein the production path conforms to an Infiniband protocol.

15. A non-transitory computer-readable medium having sets of instructions stored thereon for storage access which, when executed by a computer, cause the computer to perform actions including:
   executing, using one or more data processors, from a non-transitory computer readable storage medium, instructions that when executed on the one or more data processors, cause the one or more data processors to perform actions including:
      receiving a request to create a virtual machine;
      creating an instance of the virtual machine, wherein the virtual machine comprises initial instructions, and wherein the initial instructions facilitate initiating and enabling a boot path from the virtual machine to a boot memory wherein the boot memory comprises:
         a boot kernel comprising first instructions; and
         an operating system comprising second instructions;
      executing the initial instructions to:
         initiate the boot path;
         configure the boot path; and
         enable the boot path;
      transferring, using the boot path, the boot kernel to the virtual machine from the boot memory;
      loading the boot kernel on the virtual machine;
      executing the first instructions of the boot kernel, wherein executing the first instructions causes:
         configuring a production path between the virtual machine and the boot memory; and
         enabling the production path;
      transferring, using the production path, the operating system to the virtual machine from the boot memory;
      loading the operating system on the virtual machine;
      executing the second instructions on the virtual machine;
      detecting that the production path has been successfully configured; and
      in response to the detecting, disabling the boot path.

16. The non-transitory computer-readable medium having sets of instructions stored thereon for storage access of claim 15, further comprising an action of detecting a production path failure or the virtual machine executing the initial instructions, and in response to the detecting, enables the boot path.

17. The non-transitory computer-readable medium having sets of instructions stored thereon for storage access of claim 15, further comprising a load balancer comprising a multiplex input/output (MPxIO) device that enables the virtual machine to be accessed through multiple storage access paths from a single operating system instance.

18. The non-transitory computer-readable medium having sets of instructions stored thereon for storage access of claim 15, further comprising actions that connect the boot path to the boot memory using a single global user interface id and/or connect the production path to the boot memory using a single global user interface id.

19. The non-transitory computer-readable medium having sets of instructions stored thereon for storage access of claim 15, wherein the boot path and the production path conform to an internet small computer system interface.

20. The non-transitory computer-readable medium having sets of instructions stored thereon for storage access of claim 15, wherein the boot path conforms to a Gb Ethernet protocol and/or wherein the production path conforms to an Infiniband protocol.

\* \* \* \* \*

UNITED STATES PATENT AND TRADEMARK OFFICE
CERTIFICATE OF CORRECTION

| | | |
|---|---|---|
| PATENT NO. | : 10,180,844 B2 | Page 1 of 1 |
| APPLICATION NO. | : 15/411467 | |
| DATED | : January 15, 2019 | |
| INVENTOR(S) | : Aimone | |

It is certified that error appears in the above-identified patent and that said Letters Patent is hereby corrected as shown below:

In the Drawings

On sheet 3 of 4, in FIG. 3, under Reference Numeral 310, Line 2, delete "CONFIGUATION" and insert -- CONFIGURATION --, therefor.

In the Specification

In Column 8, Line 45, delete "insidge" and insert -- inside --, therefor.

Signed and Sealed this
Seventh Day of January, 2020

Andrei Iancu
*Director of the United States Patent and Trademark Office*